Patented Feb. 1, 1949

2,460,603

UNITED STATES PATENT OFFICE 2,460,603

PREPARATION OF ALPHA-CYANO ESTERS

Waldo L. Semon, Silver Lake Village, Ohio, assignor to The B. F. Goodrich Company, New York, N. Y., a corporation of New York No Drawing. Application September 11, 1946, Serial No. 696,355

3 Claims. (Cl. 260—465.4)

This invention relates to the preparation of alpha-cyano-alkyl esters of monocarboxylic acids, and in particular to an improved process for the preparation of alpha-cyanoethyl acetate.

Accroding to my invention, alpha-cyano esters of monocarboxylic acids having the following formula:

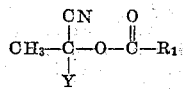

wherein Y is hydrogen or an alkyl group and $R_1$ is the residue of a monocarboxylic acid such as an alkyl, cycloalkyl, aryl or other hydrocarbon radical or a substituted alkyl, cycloalkyl or aryl radical, are prepared by reacting a dialkyl cyano carbinol with an alpha-beta unsaturated ester of a monocarboxylic acid, in the presence of a small amount of a slightly basic material as a catalyst. Such compounds as tertiary amines and alkali metal salts of weak acids are suitable catalysts. Usually about 1% to about 5% by weight, based on the total weight of the reactants, is an amount sufficient to catalyze the reaction efficiently. The reaction takes place in accordance with the following reaction equation:

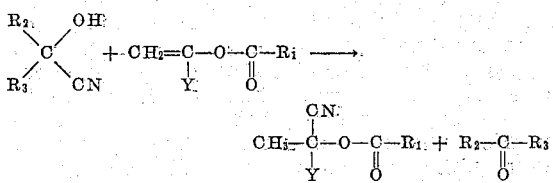

wherein $R_2$ and $R_3$ are alkyl radicals and Y and $R_1$ are the same as defined above.

The dialkyl cyano carbinols which are employed according to my invention are preferably prepared by the reaction of hydrogen cyanide with an aliphatic ketone or by the reaction of an aliphatic ketone bisulfite addition compound with sodium or potassium cyanide. Such tertiary cyano alcohols as dimethyl cyano carbinol (acetone cyanhydrin), methyl ethyl cyano carbinol, dimethyl cyano carbinol, methyl propyl cyano carbinol, methyl isopropyl cyano carbinol, methyl butyl cyano carbinol, methyl-n-propyl cyano carbinol, di-n-propyl cyano carbinol, methyl isoamyl cyano carbinol, dibutyl cyano carbinol, di-n-amyl cyano carbinol, dihexyl cyano carbinol and the like are suitable reactants for my process. Any other dialkyl cyano carbinol may also be used.

Any alpha-beta unsaturated ester of a monocarboxylic acid can be reacted with the above tertiary cyano alcohol, according to my invention. The preferred esters are those produced by the reaction of an alkyne such as acetylene with an aliphatic monocarboxylic acid. Such compounds as vinyl acetate, vinyl propionate, vinyl butyrate, vinyl valerate, vinyl benzoate, isopropenyl acetate, 1-butene-2-acetate, vinyl chloroacetate, and the like are suitable reactants.

The preferred method of performing my invention is to react an alpha-beta unsaturated ester of a monocarboxylic acid with dimethyl cyano carbinol (acetone cyanhydrin) in the presence of about 3% by weight based on the total weight of reactants of a weak alkaline catalyst. In this event, as seen from the general reaction equation, acetone is one of the reaction products, and can be re-used to form the cyanhydrin either directly by reacting with hydrogen cyanide or indirectly through the bisulfite compound. Dimethyl cyano carbinol is thus the preferred tertiary cyano alcohol because it can be produced from acetone, a material which is available in large quantities at low cost. The preferred alpha-beta unsaturated ester is vinyl acetate which can be prepared in low cost from acetylene and acetic acid.

The alpha cyano esters obtained by the process of this invention have many uses in the synthesis of other organic chemical compounds. For example by pyrolysis of alpha-cyanoalkyl acetates acrylonitrile or one of its homologs can be produced, and the aliphatic acid which is split off can be recovered and used in forming more of the esters.

The following specific examples are set forth merely to illustrate my invention, for it is to be understood that any of the reactants mentioned above may be substituted for the specific reactants here used without departing from the invention. The parts appearing in the examples are by weight:

Example I 85 parts of freshly prepared acetone cyanhydrin (prepared from acetone and HCN), 94.5 parts of vinyl acetate and 4 parts of triethylamine, as a catalyst, were placed in a reaction vessel fitted with a reflux condenser. This mixture was heated to reflux temperature, about 65° C. to about 75° C., for 40 minutes. The reaction mixture was then transferred to a still pot and distilled at atmospheric pressure. A fraction boiling at 55° C. to 120° C. was collected and was found to contain mainly acetone and triethyl amine. 116.5 parts of a fraction boiling at 165° C. to 168° C. were then collected and it was found that this fraction consisted entirely of alpha-cyanoethyl acetate. This represents a yield of 94%.

*Example II*

82.5 parts of acetone cyanhydrin, 94.5 parts of vinyl acetate and 3 parts of sodium cyanide, as a catalyst, were added to a reaction vessel fitted with a reflux condenser. This mixture was heated to reflux temperature, about 65° C. to 75° C., for about 30 minutes and then transferred to a distillation unit where the reaction mixture was separated into its components. The first fraction, boiling at 55° C. to 120° C., was found to contain mainly acetone. A second fraction of 84.2 parts was recovered, which had a boiling point of 165° C. to 168° C., and was again found to contain only alpha-cyanoethyl acetate. This was a yield of 82%. The catalyst remained in the still pot.

The acetone fraction that was removed from the product at 55° C. to 120° C., as in the above examples, was reacted with hydrogen cyanide to re-form acetone cyanhydrin, and was then employed as a starting reactant together with a fresh supply of vinyl acetate. Proceeding in this manner, it was discovered that a yield of about 90 to about 98% of the alpha-cyano esters could be obtained in about 30 to about 40 minutes at reflux temperature. Thus the process can be made continuous if desired.

The materials which may be employed as catalysts for the formation of the alpha-cyano esters are, for example, tertiary amines, such as trimethyl amine, triethyl amine, tripropyl amine, tributyl amine, tri isobutyl amine, and the like, and alkali metal salts of weak acids, such as sodium cyanide, potassium cyanide, sodium silicate, sodium carbonate, sodium tetraborate, and the like.

The amount of catalyst employed according to my process is not critical, for as little as about 1% by weight to as much as 5% by weight or more, based on the total weight of the reactants, can be used, but, when the reaction is carried out at atmospheric pressure, about 3% by weight of catalyst is sufficient. It will be understood that the catalyst requirements will vary under different reaction conditions as when the reaction is carried out at super atmospheric pressure and at elevated temperatures and/or when other reactants are used.

The temperature and pressure at which the reaction is effected may also be varied widely and are not critical. Temperatures as low as room temperature or lower may be used or as high as 100° C. or even higher, while the pressure may be varied from atmospheric or below to considerably above atmospheric pressure. Ordinarily, it is most convenient to operate at atmospheric pressure and at the reflux temperature of the reactants.

An outstanding advantage of my process over existing processes for preparing cyano esters is that the dangers involved in the use of hydrogen cyanide can be greatly reduced, for the tertiary cyano alcohols employed as reactants can be prepared through the reaction of the ketone bisulfite addition compound with sodium or potassium cyanide as hereinbefore stated. On the other hand when the tertiary cyano alcohol is prepared by the reaction of a ketone with hydrogen cyanide, this reaction occurs rapidly at room temperature and the product has a much higher boiling point and lower partial pressure than hydrogen cyanide, thus simplifying the factory handling of the materials. Accordingly, occupational hazards are kept at a minimum and equipment of special design need not be used.

Another advantage in the process disclosed resides in the fact that cyano esters are obtained more rapidly by the use of the reactants herein described than when other reactants are used.

While I have illustrated my invention by means of specific examples, I do not thereby desire nor intend to limit myself solely thereto, for as hitherto stated, the precise proportions of the materials employed may be varied, and other materials having equivalent chemical properties may be employed if desired without departing from the spirit and scope of the invention as defined in the appended claims.

I claim:

1. A process for the preparation of alpha-cyanoethyl acetate which comprises mixing acetone cyanhydrin, vinyl acetate and from 1 to 5%, based on the combined weight of acetone cyanhydrin and vinyl acetate, of an alkaline catalyst for the reaction, refluxing the mixture at atmospheric pressure whereupon chemical reaction takes place to form alpha-cyanoethyl acetate and acetone, and then fractionally distilling the mixture resulting from the reaction to remove the acetone and recover alpha-cyanoethyl acetate.

2. A process for the preparation of alpha-cyanoethyl acetate which comprises mixing acetone cyanhydrin, vinyl acetate and from 1 to 5%, based on the combined weight of acetone cyanhydrin and vinyl acetate, of triethylamine as a catalyst, refluxing the mixture at atmospheric pressure whereupon chemical reaction takes place to form acetone and alpha-cyanoethyl acetate, and then fractionally distilling the mixture resulting from the reaction to remove the acetone and amine catalyst and to recover alpha-cyanoethyl acetate.

3. A process for the preparation of alpha-cyanoethyl acetate which comprises mixing acetone cyanhydrin, vinyl acetate and from 1 to 5%, based on the combined weight of vinyl acetate and acetone cyanhydrin, of sodium cyanide as a catalyst, refluxing the mixture at atmospheric pressure whereupon chemical reaction takes place to form acetone and alpha-cyanoethyl acetate, and then fractionally distilling the mixture resulting from the reaction to remove the acetone and to recover alpha-cyanoethyl acetate.

WALDO L. SEMON.

REFERENCES CITED

The following references are of record in the file of this patent:

UNITED STATES PATENTS

| Number | Name | Date |
| --- | --- | --- |
| 2,101,823 | Dittmar | Dec. 7, 1937 |
| 2,205,239 | Carter et al. | June 18, 1940 |
| 2,390,098 | Hansley et al. | Dec. 4, 1945 |
| 2,397,341 | Ellingboe | Mar. 26, 1946 |